Feb. 25, 1969 R. E. LEE ET AL 3,429,622
FLEXIBLE BEARINGS AND PROCESS FOR THEIR MANUFACTURE
Filed March 6, 1967 Sheet 1 of 2

INVENTORS
ROBERT E. LEE
EDWARD E. McCULLOUGH
BY Edward R. Grant
ATTORNEY

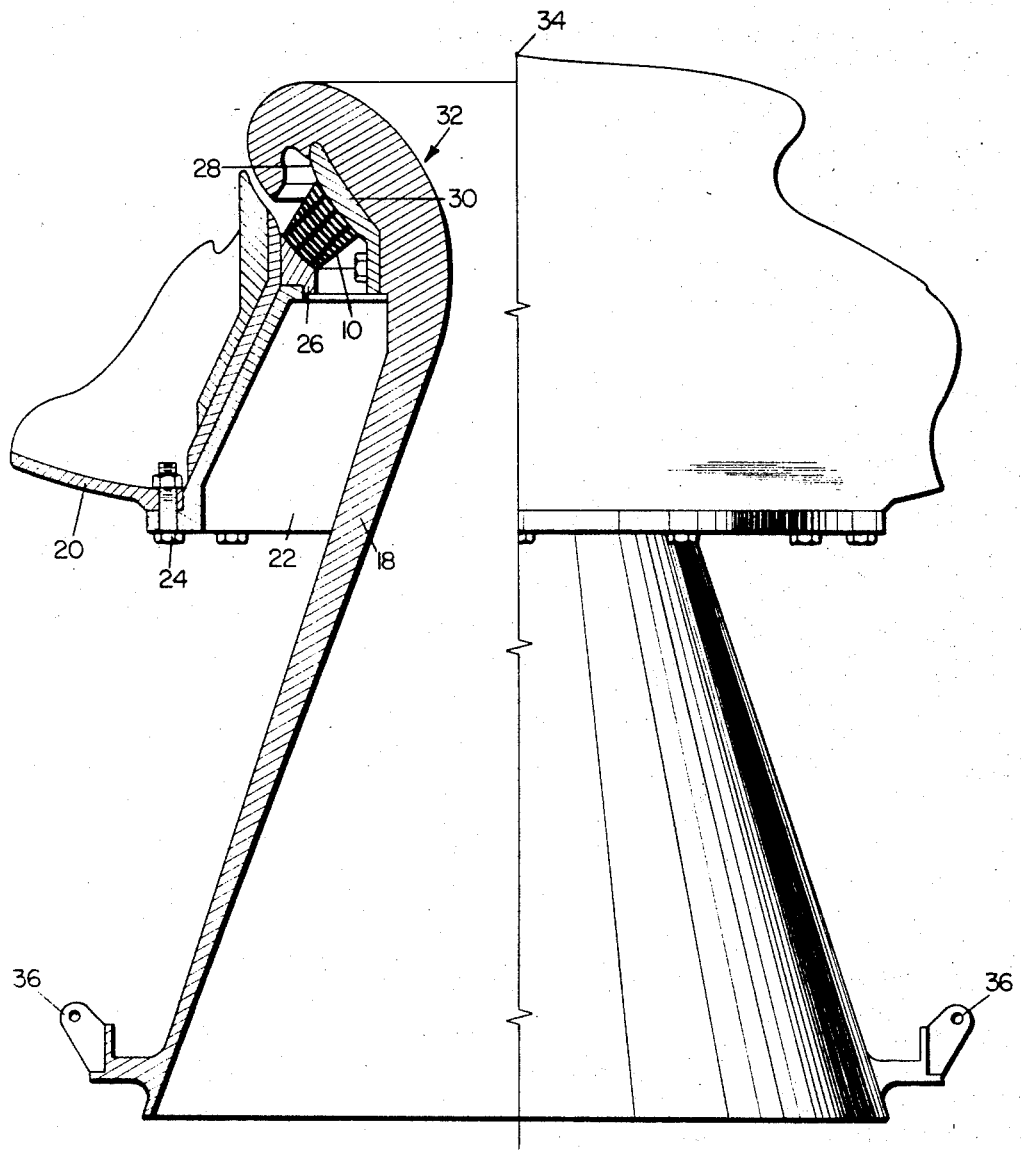
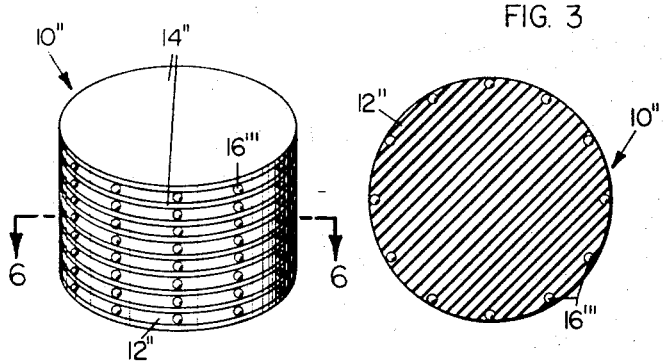
FIG. 3
FIG. 5    FIG. 6

United States Patent Office 3,429,622
Patented Feb. 25, 1969

3,429,622
FLEXIBLE BEARINGS AND PROCESS
FOR THEIR MANUFACTURE
Robert E. Lee, Ogden, and Edward E. McCullough, Brigham City, Utah, assignors to Thiokol Chemical Corporation, Bristol, Pa., a corporation of Delaware
Filed Mar. 6, 1967, Ser. No. 621,011
U.S. Cl. 308—2                              7 Claims
Int. Cl. F16c 7/00, 9/00, 11/00

ABSTRACT OF THE DISCLOSURE

A bearing formed of (1) a plurality of rigid layers, (2) a plurality of elastomeric layers disposed between said rigid layers and bonded thereto, and (3) a plurality of rigid spacers embedded within said elastomeric layers; and a process employing rigid spacers to space rigid layers of a bearing having elastomeric layers disposed between and bonded to rigid layers.

---

This invention relates to bearings and more particularly to improvements in bearings having alternate laminations of rigid and elastomeric layers, and to methods for making such bearings.

Laminated bearings having laminations of rigid and elastomeric layers are known in the prior art. Such bearings have lateral flexibility but are relatively incompressible in a direction perpendicular to their laminations. For these reasons laminated bearings have been used for supporting members, such as bridge girders, that shift relative to their supports. Furthermore, in the rocket industry there has been recent interest in adapting such bearings for use in attaching a movable thrust nozzle to the aft end closure of a rocket motor. For this use the weight, compressibility and shear modulus of a laminated bearing must be precisely controlled, and consequently the spacing between the rigid layers of such a bearing is more critical than it is for conventional applications.

The present invention provides improvements in laminated bearings and in processes for making the same. In accordance with the invention, rigid spacers are embedded in the elastomeric layers of the bearing during its fabrication. The spacers are either removed or left in the finished bearing, depending upon the particular properties desired for the bearing.

Accordingly, it is an object of this invention to provide a process by which the compressibility, torsion characteristics and shear modulus of laminated bearings can be reliably and precisely controlled.

Another object of the invention is to provide elastomeric bearings having precise dimensions and selected compressibility, shear modulus and torsion characteristics.

A further object is to provide laminated bearings having a predetermined change in lateral flexibility along the longitudinal axis thereof.

In the following description of the invention reference is made to the accompanying drawings wherein:

FIGURE 3 is a partially sectional view of the aft end of a rocket motor incorporating the same embodiment of the invention as a bearing for attaching the thrust nozzle to the aft end closure of the rocket motor;

FIGURE 5 is a perspective view of another embodiment of the invention; and

FIGURE 6 is a sectional view of the embodiment illustrated in FIGURE 5, taken along the plane represented by line 6—6 of FIGURE 5.

Throughout the specification and the drawings, like parts are designated by like numbers.

Figure 1:
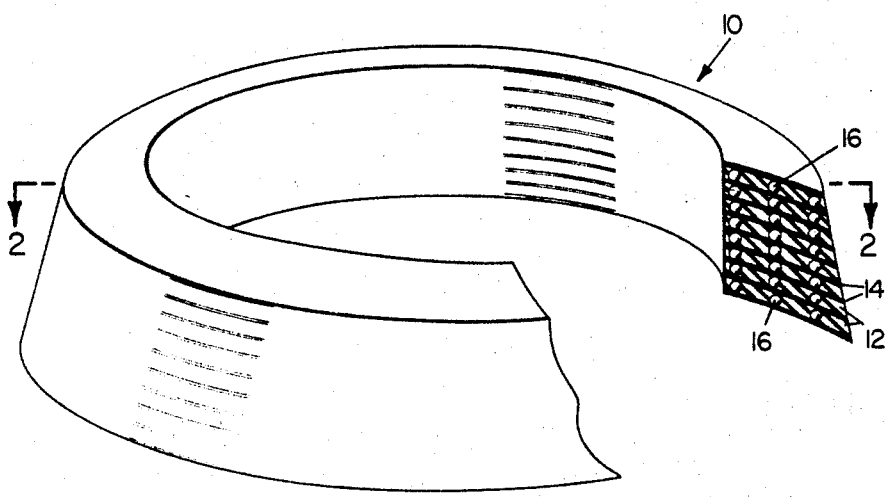
FIGURE 1 is a perspective view of a preferred embodiment of the invention, with a portion broken away to show internal structure.
Figure 2:
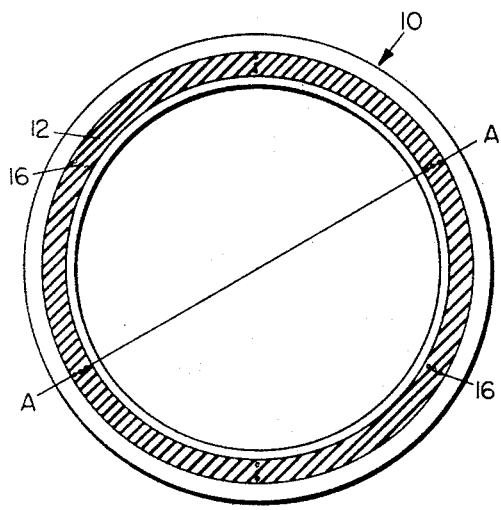
FIGURE 2 is a cross-sectional view of the same embodiment, taken along the plane represented by line 2—2 of FIGURE 1.

As illustrated in FIGURES 1, 2 and 3, an annular bearing, generally designated by reference number 10 and constituting a preferred embodiment of the invention, comprises elastomeric laminae 12 disposed between and bonded to metallic laminae 14, and a plurality of spherical metallic spacers 16 embedded in the elastomeric laminae. Spacers 16 are identical and their diameter is the same as the desired spacing between the metallic laminae. Thus, each spacer 16 is in contact with each of the two metallic laminae between which it is disposed. As illustrated in FIGURES 1 and 2, spacers 16 are geometrically disposed in the bearing in three concentric rings and in columns along planes (such as, for example, the plane represented by line A—A in FIGURE 2) that intersect at the longitudinal axis of the bearing. This arrangement of spacers 16 provides a bearing that is incompressible in a direction normal to the laminations. To impart compressibility to the bearing, the spacers may be staggered longitudinally of the bearing.

In FIGURE 3, bearing 10 is shown in use as a bearing and seal between a movable thrust nozzle 18 and an aft end closure 20 of a rocket motor. An annular adapter 22, fastened to aft end closure 20 by screws 24, supports an annular mounting block 26 to which one end of bearing 10 is bonded. The opposite end of bearing 10 is bonded to a spherical surface 28 of a second annular supporting block 30 mounted on the periphery of the convergent portion 32 of thrust nozzle 18. Each bonded surface of the bearing laminae is spherical (i.e., all points on a bonded surface of a laminae are equidistant from a point 34 which is located on the longitudinal axis of the rocket motor and about which thrust nozzle 18 pivots). Even though bearing 10 is incompressible in a direction substantially normal to its laminae, it is laterally flexible, thereby allowing thrust nozzle 18 to pivot about point 34. To effect such movement, conventional hydraulic actuators, not shown, are attached at one end to aft end closure 20 and at the other end to bosses 36 on the divergent end of thrust nozzle 18.

Metallic laminae 14 are shaped to the desired configuration on a hydraulic press. Elastomeric laminae 12 are cut from a calendered, uncured elastomeric stock, such as a polyisoprene rubber. Spacers 16 are steel balls and are embedded in each elastomeric lamina prior to assembly of the bearing. The thickness of the uncured elastomeric stock is slightly greater than the diameter of spacers 16, so that when the laminations are subjected to heat and pressure to bond them together and to cure the elastomer, excess elastomer is extruded as the metallic laminae are moved into contact with spacers 16. Thus, the distances between the metallic laminae, as well as the overall length of the bearing, are precisely established, and voids in the elastomer are eliminated.

Figure 4:
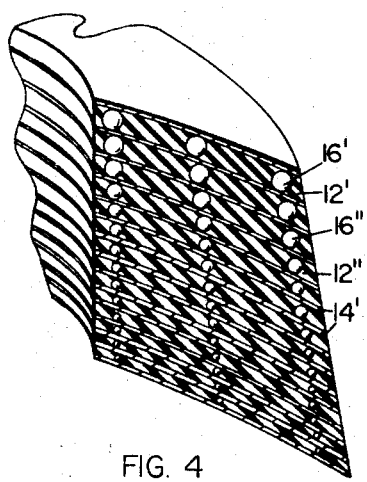
FIGURE 4 is a fragmentary section of a bearing similar to that shown in FIGURE 3, but wherein the internal structure has been modified.

FIGURE 4 illustrates a bearing similar to that shown in FIGURES 1, 2 and 3. However, this embodiment of the invention has elastomeric laminae that gradually vary in thickness from one end of the bearing to the other. Thus, lamina 12″ is thinner than lamina 12′, and so on in the successive laminations. Also, the diameters of the spacers in the respective lamina decrease in the same manner. This modification provides a bearing having a predetermined change in lateral flexibility along its longitudinal axis.

Another bearing 10″ constructed in accordance with the invention is illustrated in FIGURES 5 and 6. This bearing is in the form of a circular pad comprising spacers 16''' embedded around the periphery of each elastomeric lamina 12'' thereof. In a process modification of the invention, after bearing 10'' has been constructed, spacers 16''' are removed, thereby providing a bearing having compliance or compressibility in a direction normal to the laminations thereof. It will be recognized that this process assures accurate manufacture, resulting in bearings having uniform and predetermined properties.

Although several forms of the invention have been described, it will be understood that modifications may be made thereto without departing from the scope of the invention as defined in the appended claims. For example, various elastomers can be used and the elastomeric lamina can be bonded to the metallic laminae in various ways, depending to a considerable degree upon the materials selected. It may be necessary, for example, to apply a thin coating of a particular elastomer to surfaces of the metallic laminae in order to obtain a bond between the metal and elastomeric laminae formed of a different elastomer.

As used in the appended claims the words "rigid" and "elastomeric" are intended to connote respectively a class of materials having structural rigidity and a class of materials having elasticity.

What is claimed is:

1. In the process for making a bearing wherein elastomeric layers are stacked alternately with rigid layers, the improvement comprising embedding rigid spacers in said elastomeric layers, bonding said elastomeric layers to said rigid layers, and thereafter removing said rigid spacers.

2. The process of claim 1 wherein said spacers are spherical.

3. A flexible bearing comprising:
   alternate rigid and elastomeric laminae bonded to each other; and
   a plurality of rigid spacers embedded in said elastomeric laminae and in contact with said rigid laminae.

4. A flexible bearing as defined in claim 3 wherein said spacers are spherical.

5. A bearing as defined in claim 4 wherein the spacers in the respective lamina have varying diameters, whereby the bearing has variable lateral flexibility along its longitudinal axis.

6. A flexible bearing for sealingly attaching a movable thrust nozzle to a rocket motor comprising:
   a plurality of rigid annular laminae;
   a plurality of elastomeric annular laminae stacked alternately with said rigid annular laminae and bonded thereto; and
   a plurality of spacers embedded in at least one of said elastomeric laminae.

7. A flexible bearing as defined in claim 6 wherein the bonded surfaces of said laminae are spherical and wherein said spacers are spherical.

References Cited

UNITED STATES PATENTS

| | | | |
|---|---|---|---|
| 2,278,966 | 4/1942 | Williams | 308—6 X |
| 2,614,832 | 10/1952 | Godfrey | 308—6 X |
| 2,900,182 | 8/1959 | Hinks | 308—2 X |
| 3,144,228 | 8/1964 | Kass | 248—21 |
| 3,190,591 | 6/1965 | Bligard et al. | 248—5 |
| 3,240,454 | 3/1966 | Ormond | 248—358 X |

FOREIGN PATENTS

| | | |
|---|---|---|
| 1,342,028 | 9/1963 | France. |
| 1,351,903 | 12/1963 | France. |
| 1,164,165 | 2/1964 | Germany. |

EDGAR W. GEOGHEGAN, *Primary Examiner.*

L. L. JOHNSON, *Assistant Examiner.*

U.S. Cl. X.R.

248—358